(12) United States Patent
McCalmont (10) Patent No.: US 6,215,865 B1
(45) Date of Patent: *Apr. 10, 2001

(54) SYSTEM, METHOD AND USER INTERFACE FOR DATA ANNOUNCED CALL TRANSFER

(75) Inventor: David T. McCalmont, San Jose, CA (US)

(73) Assignee: e-talk Corporation, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/170,930

(22) Filed: Oct. 13, 1998

(Under 37 CFR 1.47)

Related U.S. Application Data (63) Continuation of application No. 08/660,997, filed on Jun. 10, 1996, now Pat. No. 5,915,010.

(51) Int. Cl.[7] .............................. H04M 3/58; H04M 1/57; H04M 3/523
(52) U.S. Cl. ......................... 379/212; 379/142; 379/246; 379/265
(58) Field of Search .................................... 379/142, 210, 379/212, 214, 246, 247, 265, 266, 309

(56) References Cited

U.S. PATENT DOCUMENTS

| | | | |
|---|---|---|---|
| 4,379,946 | 4/1983 | Mizuno et al. | 178/3 |
| 4,706,080 | 11/1987 | Sincoskie | 340/825.02 |
| 4,706,081 | 11/1987 | Hart et al. | 340/825.03 |
| 4,757,267 | 7/1988 | Riskin | 379/113 |
| 4,805,209 | 2/1989 | Baker, Jr. et al. | 379/93.23 |
| 4,821,034 | 4/1989 | Anderson et al. | 340/825.8 |
| 4,866,758 | 9/1989 | Heinzelmann | 379/93.15 |
| 4,942,540 | 7/1990 | Black et al. | 709/228 |
| 4,943,996 | 7/1990 | Baker, Jr. et al. | 379/93.23 |

(List continued on next page.)

FOREIGN PATENT DOCUMENTS

0377394  11/1990  (EP) .............................. H04M/3/50

*Primary Examiner*—Harry S. Hong
(74) *Attorney, Agent, or Firm*—Baker Botts L.L.P.

(57) ABSTRACT

A system and method for use in call center operations enables a customer service representative (CSR) to transfer a customer to a receiving CSR with selected data that describes the reason for the transfer. The receiving CSR receives the transferred customer call and the selected data and is able to continue efficiently handling the customer call. The system includes a number of CSR workstations each executing a telephony client in conjunction with a telephony server providing integration of customer data from a call center database and voice communication handled by an automatic call distributor (ACD). The telephony client includes a user interface for selecting a destination for transferring a customer call and one or more reason data element that describe the reason for transferring the call. The customer call is transferred by the ACD according to the selected destination. The telephony clients provides the reason data and a line identifier of the customer call to the telephony server. The ACD provides the telephony server with the extension of the CSR to whom the customer call is transferred, and a line identifier of the customer call. The telephony server matches the line identifier, which uniquely identifies the customer call, and forwards the reason data provided from the originating CSR to the receiving CSR at the destination extension.

18 Claims, 9 Drawing Sheets

U.S. PATENT DOCUMENTS

| | | | |
|---|---|---|---|
| 5,007,017 | 4/1991 | Kobayashi | 709/218 |
| 5,008,930 | 4/1991 | Gawrys et al. | 379/210 |
| 5,097,528 | 3/1992 | Gursahaney et al. | 379/88.21 |
| 5,136,634 | 8/1992 | Rae et al. | 379/100.11 |
| 5,181,239 | 1/1993 | Jolissaint | 379/93.25 |
| 5,271,058 | 12/1993 | Andrews et al. | 379/210 |
| 5,291,551 | 3/1994 | Conn et al. | 379/265 |
| 5,335,269 | 8/1994 | Steinlicht | 379/266 |
| 5,555,299 | 9/1996 | Maloney et al. | 379/212 |
| 5,684,870 | 11/1997 | Maloney et al. | 379/212 |
| 5,754,638 | 5/1998 | Kusunoki | 379/212 |
| 5,768,262 | 6/1998 | Hallock et al. | 370/259 |
| 5,915,010 * | 6/1999 | McCalmont | 379/212 |

* cited by examiner

ACME Order Center-1000

| Customer Name | Contact Name | Account Number | Phone Number |
|---|---|---|---|
| Kronos Timepieces, Inc. | Billy Smith | 12345-67890 | (909) 939-9943 |
| 300a | 300b | 300c | 300d |

Transfer To: ▭ —301

Reason: ▭ 303

[Pop]
[Bypass]
[Transfer]

ACME Order Center-1000

| Customer Name | Contact Name | Account Number | Phone Number |
|---|---|---|---|
| Kronos Timepieces, Inc. | Billy Smith | 12345-67890 | (909) 939-9943 |
| 300a | 300b | 300c | 300d |

Transfer To:
```
Customer Service    302  8, 100    -301
Collections              8, 200    303
Order Processing         8, 300
Supplies Marketing       8, 400
Supplies, Santa Ana      9, 800
Other
```
Reason:

302a

[Pop]
[Bypass]
[Transfer]

CSR TELEPHONE EXTENSION 123
LINE IDENTIFIER 127
I.P. ADDRESS 121
. . . .

LINE IDENTIFIER 127
CUSTOMER TELEPHONE NO.
CUSTOMER ACCOUNT NO.
. . . .

FIGURE 7

SYSTEM, METHOD AND USER INTERFACE FOR DATA ANNOUNCED CALL TRANSFER

This application is a continuation of U.S. application Ser. No. 08/660,997 filed Jun. 10, 1996 entitled "System, Method and User Interface for Data Announced Call Transfer," now U.S. Pat. No. 5,915,010 issued on Jun. 22, 1999.

BACKGROUND

1. Field of the Invention

The invention relates generally to the field of data processing and management methods for telephone systems, and more particularly, to systems, methods, and user interfaces for transferring customer calls between customer service representatives in a call center.

2. Background of the Invention

Call center operations are used by many companies to provide an enhanced and broadened range of customer services. Call centers are typically used to process account inquiries for existing customers, to accept orders for products or services from new or existing customers, provide technical support, and the like. An employee who handles customer calls is typically known as a customer service representative ("CSR"). A typical company will often have several different groups of CSRs ("customer service groups"), each group providing different types of customer services, such as sales, account inquiries, technical support and so forth.

In many cases the CSR who receives a customer call is not alone able to assist the customer and requires another CSR to handle the call. The originating CSR will then transfer the customer call to a receiving CSR or to a call queue of another customer service group for further processing.

There are two conventional ways of transferring a customer call, a blind transfer and a voice announced transfer. In a voice announced transfer, the originating CSR transfers the customer call, placing the call in a queue for either a particular CSR, or a particular customer service group. The originating CSR stays on the line with the customer until a receiving CSR is reached. The originating CSR then informs the receiving CSR of the reason for the transfer, such as the need for particular services of the receiving CSR, and the like. This information helps the receiving CSR understand the customer's needs and thereby provide better service. At this point, the originating CSR can release the line.

In a blind transfer, the originating CSR transfers the customer call to a receiving CSR or group, and then releases it from his line. The originating CSR does not stay on the line, but can then immediately receive and handle another customer call.

Unfortunately, there are problems with both of these approaches, which result in both reduced levels of customer service or decreased efficiency in the call center operation. With the voice announced transfer, the originating CSR and the customer must wait together in the queue for the receiving CSR to be reached. Because the originating CSR is waiting, effectively on hold, he is not able to return his line to the queue so that other customer calls can be connected to him for customer service. This lowers the productivity of the originating CSR and the overall throughput and efficiency of the call center, and ultimately reduces customer service. In addition, the customer must wait on hold while the discussion between the originating CSR and receiving CSR is occurring, typically increasing the customer's frustration with the delay in receiving service.

However, a blind transfer, while freeing up the originating CSR, also reduces customer service. This is because the receiving CSR does not have any information about the customer call and the customer's needs, the reason for the transfer and the like. The receiving CSR will typically have to ask the customer for this information. The CSRs lose time and efficiency in handling the customer's needs, and the customer's frustration increases from having to deal with multiple CSRs, and having to repeat information previously communicated.

The simple use of ISDN for integrated voice/data transfers is known. However, ISDN merely provides a transport mechanism for associating and transferring voice and data. ISDN does not inherently include in such integrated voice/data transfers a description of the reason for transferring the customer call. Rather, ISDN merely provides for correctly associating existing data for the customer, such as the customer's account balance, account number and the like, with the customer's voice line, and transferring this information consistently from one CSR to another.

Similarly, other types of integrated voice/data transfers do not generally overcome these problems since they simply allow both voice and data to be moved simultaneously from the originating CSR to the receiving CSR (or queue). The receiving CSR still has no context for the reason for the transfer unless the originating CSR stays on the line and verbally informs the receiving CSR of the reason for the transfer. In addition, the originating CSR may have altered the customer's data in a host database, and may need to explain to the receiving CSR the reasons for such changes.

In addition, some existing voice/data systems rely on the existence of customer data in the existing host databases of the call center, and modify this data, possibly for describing the reason for the transfer. However, if the customer does not have any customer data already stored, such as a new customer calling about a product, or for sales information, or the like, there is no customer data available to be modified, and it is even more inefficient for the originating CSR to enter all of the necessary information about the customer into the host databases merely to transfer the call to another CSR.

Accordingly, what is needed is a system and method that combines the efficiency of a blind transfer, with the information about the transfer provided by voice announced transfer. More particularly, it is desirable to provide a system, method and user interface that allow the originating CSR to transmit selected data to a receiving CSR that describes the reasons, status, or other information about a transferred customer call.

SUMMARY OF INVENTION

The present invention overcomes the limitations of conventional systems by providing in its various embodiments, systems, methods, and user interfaces for data announced call transfer. The systems and methods are adaptable to call centers with both single and multiple automatic call distributors (ACD). In one embodiment of the present invention, the call center includes a number of CSRs, each operating a CSR workstation executing a screen based telephony client capable of initiating a transfer of a customer call on the CSR's telephone. The CSR workstations are routed customer calls by an ACD. The CSR workstations further may receive customer data, such as account information, from a telephony server and connected databases.

After receiving a customer call, an originating CSR initiates a request on his CSR workstation to transfer the customer call. The originating CSR provides a destination for the customer call. Potential destinations include other CSR telephone extensions, other queues or groups within the call center's ACD, or groups of CSRs that are in another call center that is either physically or logically connected to the local ACD.

In addition to specifying a transfer destination, the originating CSR provides a data input to the CSR workstation describing the reason for the transfer. The data input may further include the status of the customer call, the status of the customer's account, or other useful information to the receiving CSR so that the receiving CSR can understand the nature of the transfer. In one preferred embodiment, the reason for the transfer is selected from a pre-configured list or menu of selections. For example, the pre-configured list may include such data selections as "Caller has not paid bill," "Caller needs current balance," "Caller needs promotional literature," and the like. The originating CSR may also input other data describing the transfer if the list is not sufficient. For example, in one embodiment, the pre-configured list includes a selection for "Other . . . ", which allows the originating CSR to input the other data. This other data may include text data entered into a text dialog box, and providing a short explanation of the reason for the transfer, and other information. Alternatively, the other data may include a voice recording of the originating CSR describing the reasons for the transfer.

Once these two selections have been made, the originating CSR completes the transfer, and releases his line back to a queue for receiving incoming customer calls from the ACD.

The customer call is then re-queued at the ACD for routing to the supplied destination. When this happens, the input reason data that has just been specified is provided to the telephony server where it is queued until the ACD assigns a receiving CSR to the customer call. Once the ACD assigns the receiving CSR, it forwards the telephone extension of the receiving CSR to the telephony server. The telephony server forwards the reason data to the receiving CSR. This reason data is then displayed by the telephony client on the receiving CSR's workstation. The receiving CSR knows why the customer call is being transferred, and can immediately service the customer's needs.

The present invention may be used to eliminate the inefficiency of voice announced transfers, and the poor customer service provided by blind transfers. The originating CSR can immediately return to the queue and accept the next customer call, even before the original customer's voice and reason data have been presented to a receiving CSR (for example, when another customer call is still queued for the next-available receiving CSR). Therefore the data announced transfer provides both efficiency and enhanced customer service.

However, sometimes the originating CSR may still choose to remain on the line and converse briefly with the receiving CSR. The data-announced transfer method may still be used in this case, and results in improved efficiency because the receiving CSR is still presented with the reason for the transfer even before he converses with the originating CSR.

DETAILED DESCRIPTION OF THE INVENTION

Figure 1:
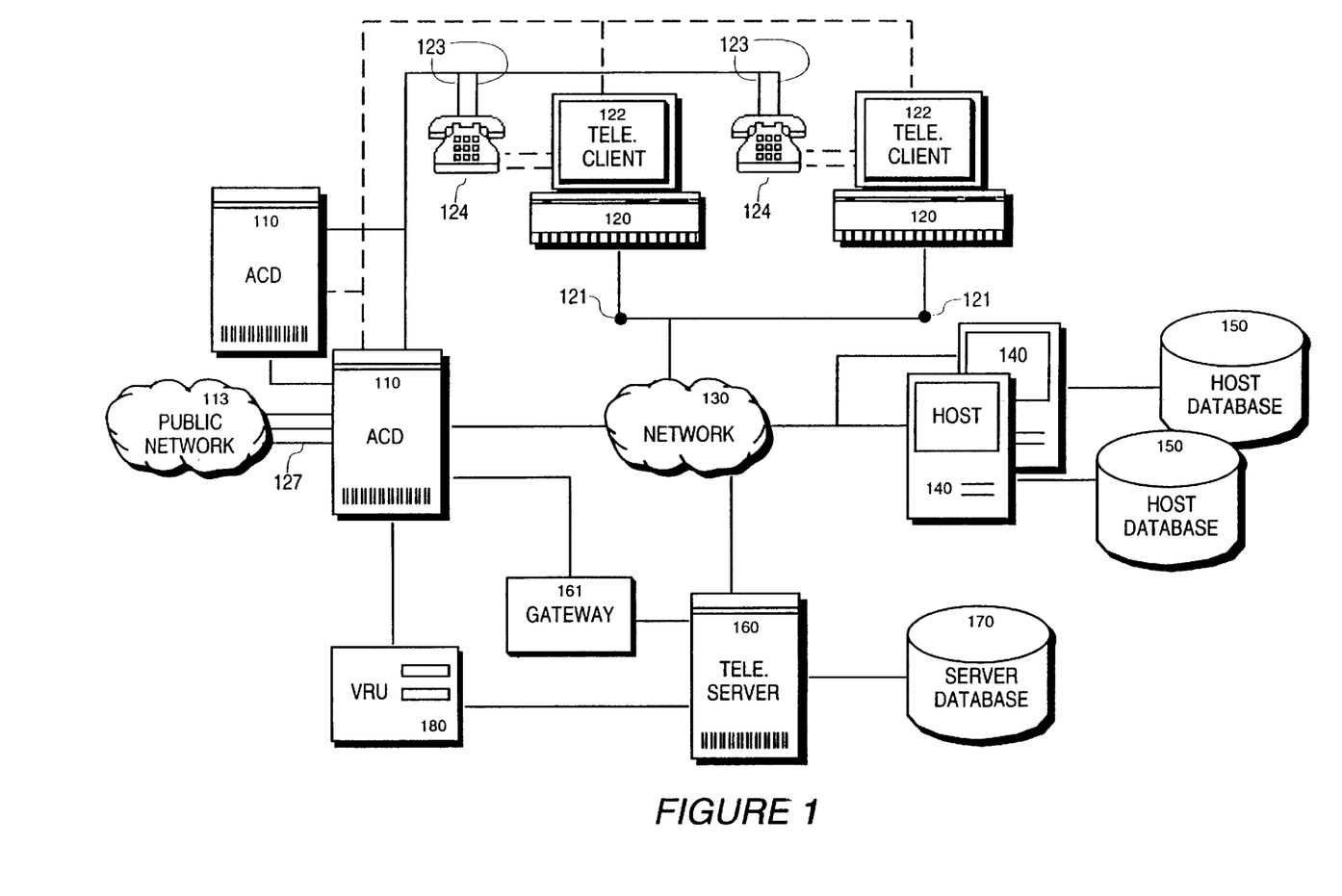
FIG. 1 is an illustration of a call center system in accordance with various embodiments of the present invention.

Referring now to FIG. 1, there is shown an illustration of the call center system operating in accordance with various embodiments of the present invention. The call center system 100 includes at least one automatic call distributor (ACD) 110, a plurality of customer service representative (CSR) workstations 120 each executing computer software providing a screen based telephony client 122, a plurality of CSR telephones 124, each capable of supporting, preferably, at least two extensions 123, a telephony server 160 coupled to a server database 170 by a network 130, such as a LAN, WAN and the like, and one or more host computers 140, variously coupled to host databases 150 by the network 130.

The ACD 110 receives incoming customer calls and routes them to a selected CSR at a CSR telephone extension 123, which may be coupled to the ACD 110 in a conventional manner. Multiple ACDs 110 may be located in the same physical facility, or communicatively coupled between different facilities. The ACD 110 may receive customer calls from the public network 113, or along private dedicated lines from other ACDs 110 in other call centers. Each customer call received by the ACD 110 has a line identifier 127 identifying the trunk line on which the call is received. For an incoming call, the ACD 110 is preferably able to obtain caller identifier data, typically the caller's telephone number, using, for example, Caller ID or Automatic Number Identifier (ANI) information provided by an ISDN interface. Other caller identifier data may also be obtained, such as input account numbers, and the like, with the use a voice response unit (VRU) 180. The line identifier 127 of a customer call is used by the ACD 110 to maintain the proper logical identification of each incoming call in relation to an assigned CSR telephone extension 123. The ACD 110 routes the voice component of a customer call to a CSR telephone extension 123 based on various queuing algorithms, for example, routing the longest holding call to the CSR telephone extension 123 that has been available the longest. Those of skill in the art will appreciate that numerous other queuing and assignment algorithms are also applicable.

Each CSR workstation 120 is connected to the network 130, and has a network IP address 121 that specifies its location or identity on the network 130 for receiving data from the telephony server 160 and the host databases 150. A CSR workstation 120 may be implemented with a conventional computer, such as a Intel-based computer. In a preferred embodiment the CSR workstation 120 is based on an Intel 80486 or Pentium processor, with 16 Mb of RAM, and a conventional operating system, preferably either the Microsoft Windows 3.x or Windows95 operating system. The CSR workstation 120 further includes a display device, preferably a VGA compatible color display, a keyboard for text and other data inputs, and a pointing device, such as a mouse.

The call center 100 further includes a telephony server 160. The telephony server 160 provides control and coordination of voice and data, and particularly provides customer data for customer calls to each of the CSR workstations 120. The telephony server 160 executes on a conventional computer or workstation, such as an Intel 80486 or Pentium based computer, or a Sun Microsystems, Inc. SPARCstation™, in each case preferably using Sun's Solaris 2.x operating system. The telephony server 160 preferably has 32–64 Mb of memory, depending on the size of the call center and the number of CSR workstations 120 being supported. The application for the telephony server 160 executes conventionally in such memory, may provided in various forms of computer readable memory, such as CD-ROM, 8 mm tape, floppy diskette, or the like, for conventional installation and execution.

Figure 7:
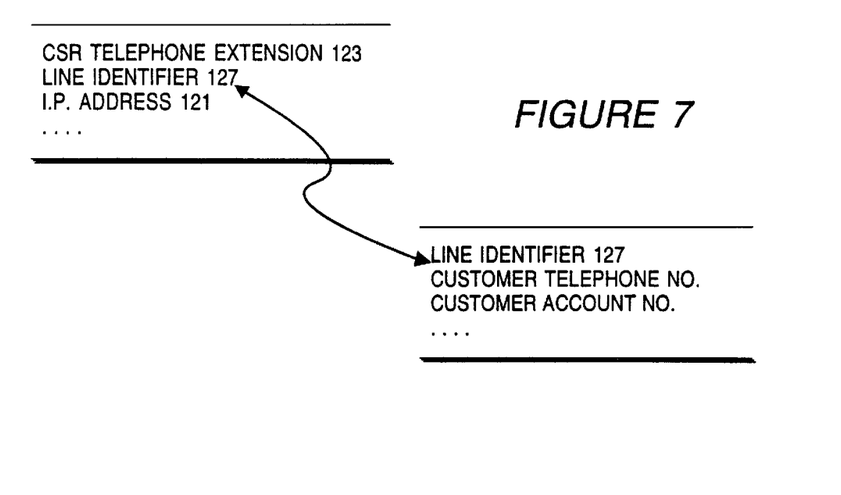
FIG. 7 is an illustration of a portion of a database schema for use by a telephony server in accordance with one embodiment of the invention.

The telephony server 160 manages a server database 170, preferably with at least 1 Gb of disk storage, with suitable backup and recovery systems. The server database 170 maintains various tables useful to control and transfer calls and customer data. FIG. 7 illustrates the schema for one set of such tables. Table 700 correlates the extension 123 of the CSR telephone 124 used by the ACD 110, the network IP address 121 of the CSR workstation 120 of the CSR, and the line identifier 127 of the customer call(s) that the CSR is currently handling. Table 702 correlates the line identifier 127 of each customer call and caller identifier data, such as customer telephone numbers, and the like, and account data maintained on the host databases 150, such as account numbers, names, and the like. Additionally, the telephony server 160 may use the line identifier 127 in table 702 as a foreign key to table 700, or other key values for retrieving and updating information between the tables. The host computers 140 support conventional enterprise databases 150, including account information, technical support data, and the like. The databases 150 are preferrably relational, and support SQL or other database manipulation and definition languages.

Each CSR workstation 120 executes a telephony client 122 of the telephony server 160. Minimally, the telephony client 122 supports the ability to initiate the transfer of a customer call from the telephone extension 123 associated with the CSR workstation 120. Call transfer by the telephony client 122 is provided using either first or third party control, as further described below. The telephony client 122 further provides data retrieval and data entry operations on data screens provided by the telephony server 160 from one or more of the host computers 140 and host databases 150. The telephony client 122 is executed in the memory of the CSR workstation 120 in a conventional manner. The telephony client 122 maybe provided to the CSR workstation in various forms of computer readable memory, such as CD-ROM, 8 mm tape, floppy diskette, or the like, for installation and execution thereon.

The telephony server 160 receives from the ACD 110 a line identifier 127, caller identifier, and CSR telephone extension 123. With the caller identifier, such as the ANI or VRU 180 provided data, the telephony server 160 performs a database lookup in its database 170, to obtain additional caller identification data useful to obtaining additional specific customer data from the host databases 150, such as the customer's name, company, city, account number, and the like, as needed to interrogate the host database 150. For example, a lookup in table 702 on the customer's telephone number from ANI would return the customer's account number. The telephony server 160 would then update the table 702 with the line identifier 127 of the customer's call.

The account number, for example, may then be used to access further customer data in the host databases 150.

With the CSR telephone extension 123 the telephony server 160 further performs a lookup in database 170 to obtain the network IP address 121 of the CSR workstation 120 that corresponds to the CSR telephone extension 123. Such lookup may be readily performed in table 700. The located network IP address 121 allows the telephony server 160 to communicate with the CSR workstation 120 for the CSR handling the customer call associated with the line identifier 127. In one embodiment, the telephony server 160 may provide to the telephony client 122 of the CSR workstation 120 handling the call the caller identification data associated with the customer, such as an account number, and the telephony client 122 directly requests other customer data as needed from the host 140 and host database 150.

Alternatively the telephony server 160 may provide to the host computer 140 the network IP address 121 of the CSR workstation 120 and the caller identification data, which will then forward customer data associated with the caller identification data directly to the appropriate CSR workstation 120 for the network IP address 121. In either case, the CSR workstation 120 and telephony client 122 receive the customer data and display it using an appropriate user interface. The CSR is then typically able to service the caller's needs and operate on the caller data, updating it to the host database 150, if desired.

For the purposes of the present invention, each CSR has the ability to indicate an intention to transfer a customer call to another CSR, and for that intention to be provided to the ACD 110. Accordingly, in a third party control embodiment, the ACD 110 is coupled to the CSR telephone extensions 123; this is illustrated in FIG. 1 as the solid line connecting the ACD 110 to the CSR telephone extensions 123. In this embodiment, the telephony server 160 couples to the ACD 160 through a gateway 161, to provide third party control over the ACD 110 for transferring customer calls. For each customer call, the ACD 110 provides to the telephony server 110 the caller identifier, the line identifier 127, and the CSR telephone extension 123 handling the customer call.

When a call is to be transferred, a telephony client 122 passes a dial instruction request, and a destination extension (the extension 123 of a receiving CSR or a queue for a customer service group) to the telephony server 160. The telephony server 160 in turn instructs the ACD 110 through the gateway 161 to dial the destination, and transfer the active call on the CSR telephone extension 123 associated with the requesting telephony client 122.

In another embodiment, first party control is used, with each CSR workstation 120 interfacing with the ACD 110 through a digital interface. This embodiment is illustrated in FIG. 1 by the dashed lines connecting the CSR workstations 120 directly to the ACD 110. In this embodiment, the telephony client 122 has an interface to (shown as dashed lines), and control over, the CSR extension telephone 123, and controls the handling of customer calls at the extension 123, including answering, releasing, wrap up, and transferring calls. The CSR telephone 124 may be standalone. Alternatively, control over the CSR telephone 124 may be integrated directly into the CSR workstation 120 using a compatible interface, such as Teknekron Infoswitch Corp.'s Infoset™, or MCK Inc.'s Telebridge™. In this embodiment, the interface includes voice input and output, preferably through a conventional telephone headset, such as the Supra® or Mirage® headsets made by Plantronics, Inc..

For this application, the CSR workstation 120 can then directly signal the ACD 110 to transfer the active call on the CSR telephone extension 123 to destination extension or queue.

Figure 2:
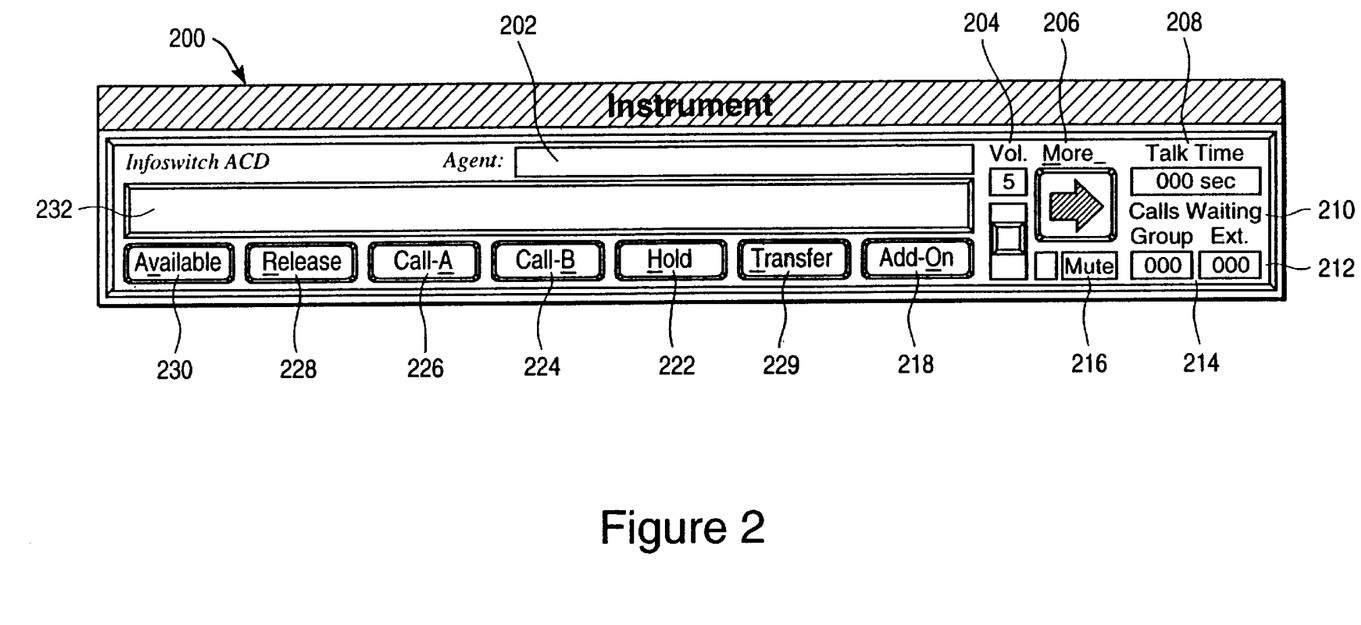
FIG. 2 is an illustration of one portion of the user interface of a screen based telephony client providing customer call handling features.

Referring now to FIG. 2, there is shown one embodiment of the user interface of the telephony client 122 providing screen based controls for answering, releasing, and transferring customer calls, along with other telephony functions. This portion of the user interface of the telephony client 122 is called the agent station 200, and preferably is operated using a mouse or a pointing device, though keyboard equivalents are supported. The agent station 200 may be used in either the first or third party control embodiment.

Accordingly, the agent station 200 includes first line button 226 for accepting or placing a call on a first extension 123, and second line button 224 for placing, transferring, or conferencing a call on a second extension 123 line. The CSR can answer either line by clicking on the appropriate button with the mouse. When the CSR answers the customer call, the incoming customer call becomes the active call on that extension 123. The line buttons 226, 224 also allow the CSR to connect to an extension 123 for outbound calling.

When a CSR completes a call, the available button 230 releases the incoming extension line 123 with active call back to the ACD 110 for queuing, and changes the status of the telephony client 122 with the ACD 110 to 'available.' A hold button 222 allows a CSR to place the active call on hold. The add-on button 218 allows the CSR to conference the active call with another extension 123. The mute button 216 controls volume muting of the active line. The line waiting field 214 indicates the number of customer calls waiting for the CSR's extension, and the group waiting field 212 indicates the number of customer calls waiting for the CSR's group at a given time. The calls waiting icon 210 flashes at a rate dependent on the number of customer calls waiting. The talk time field 208 indicates the duration of the active call. The more button 206 provides access to further functions of the telephony client 122. The volume slider 204 and field controls the volume on the active line. The agent field 202 displays the name of the CSR or other identification information. The information display field 232 displays caller identifier data, call type information, dialed digits, message, and other information.

Finally, the transfer button 220 enables the CSR to transfer the active call. When the call transfer is initiated, the originating CSR provides to the telephony client 122 both a destination for the customer call, and reason data describing the reason for the transfer. In a preferred embodiment, this information is provided to the telephony client 122 through a graphical user interface that appears when the transfer function is invoked. One embodiment of such a user interface is shown in FIGS. 3a through 3c.

Figure 3A:
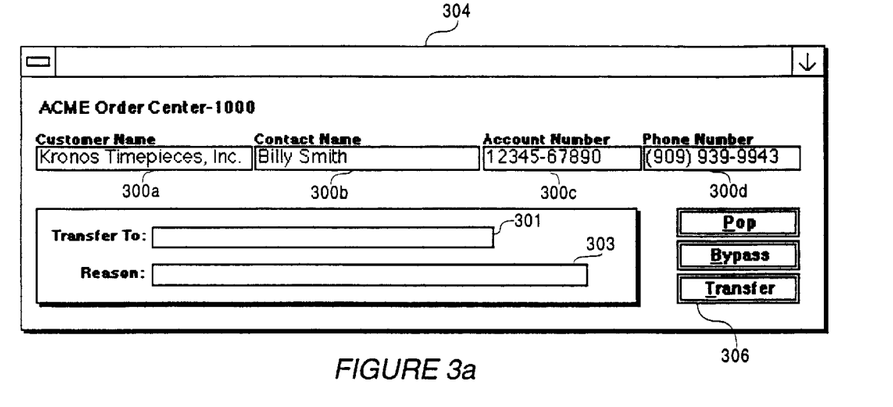
FIGS. 3a–3e are illustrations of another portion of the user interface of the screen based telephony client for inputting the reason data in accordance with present invention.
Figure 3B:
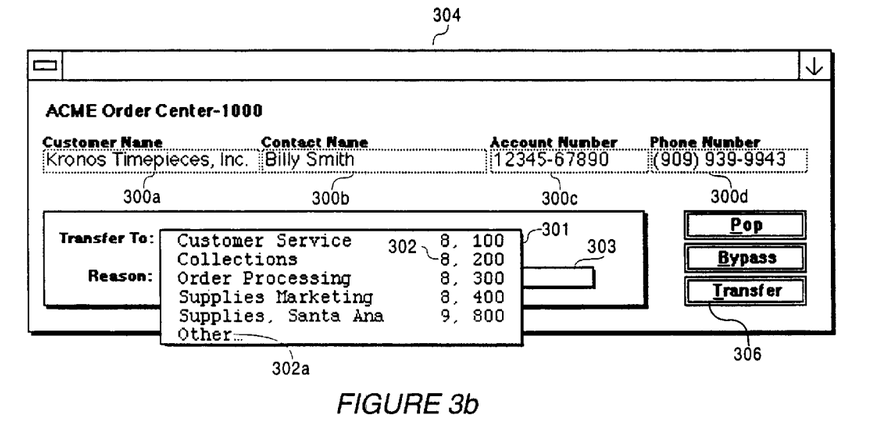
Figure 3C:
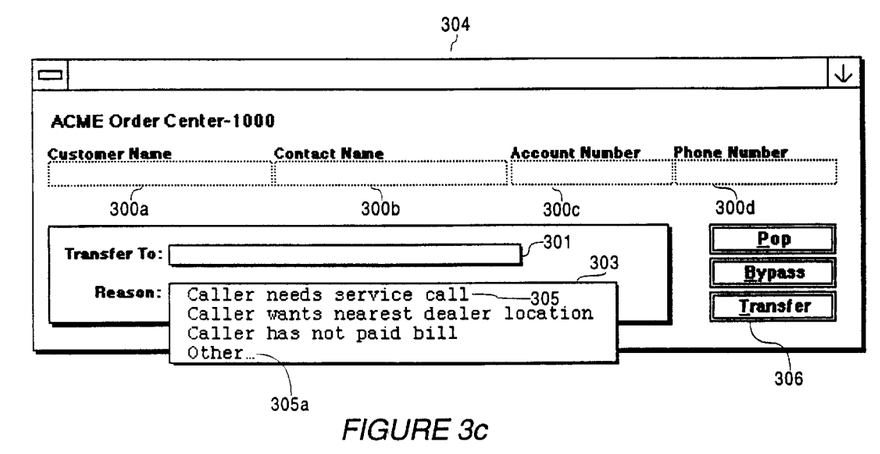

In FIG. 3a, there is shown a screen window 304 with fields 300a–d that display the customer's company name, customer name, account number, and phone number, respectively. In addition, two menus 301, 303 are provided for selecting a destination and a reason for transferring the customer call.

Figure 3D:
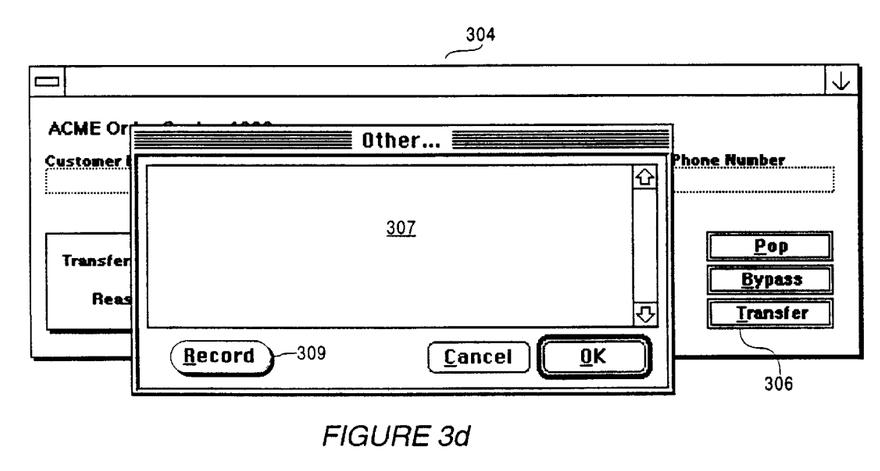

The CSR can specify a destination for the customer call using a destination menu 301 or similar mechanism, such as a pick list. The CSR can specify a receiving CSR if known, or the customer service group. The selection may be by some form of identifier, such as name, extension 123, CSR or group id, or other indicia. An example of the menu 301 is shown in FIG. 3b, and includes a list of destinations 302 for transferring the call. Entry of destinations that are not included in the list is made by selection of the "Other . . . " item 302a In accordance with one aspect of the present invention the originating CSR is then able to input to the telephony client 122 additional data describing the reason for the transfer, the status of the customer call, and the like. Any suitable text entry technique may be used to input a reason for the transfer. In a preferred embodiment, there is provided a reason menu 303 or pick list or other data entry means for describing the reason for the transfer. Preferably, the menu 303 includes predefined reason data elements 305. FIG. 3c illustrates an example of a menu 303 with a set of reason data elements 305. Where none of the predefined reason data elements 305 apply to the customer call, there is provided an additional data entry for inputting a reason not otherwise specified in the list. This is illustrated by the "Other . . . " data item 305a in FIG. 3c. Upon selection, a dialogue box 307 (FIG. 3d) appears in which the CSR may enter any data describing the reasons for the transfer. Alternatively, the CSR may record a spoken description of the reason for the transfer using the record button 309. The voice recording of the reason is stored in digitized form by the telephony server 160 and associated with the customer call in the same manner as other reason data elements. When the receiving CSR receives the transferred customer call, the receiving CSR can playback the voice recording through the telephone 124 and attached headset, if any, under the control of the telephony client 122.

Figure 3E:
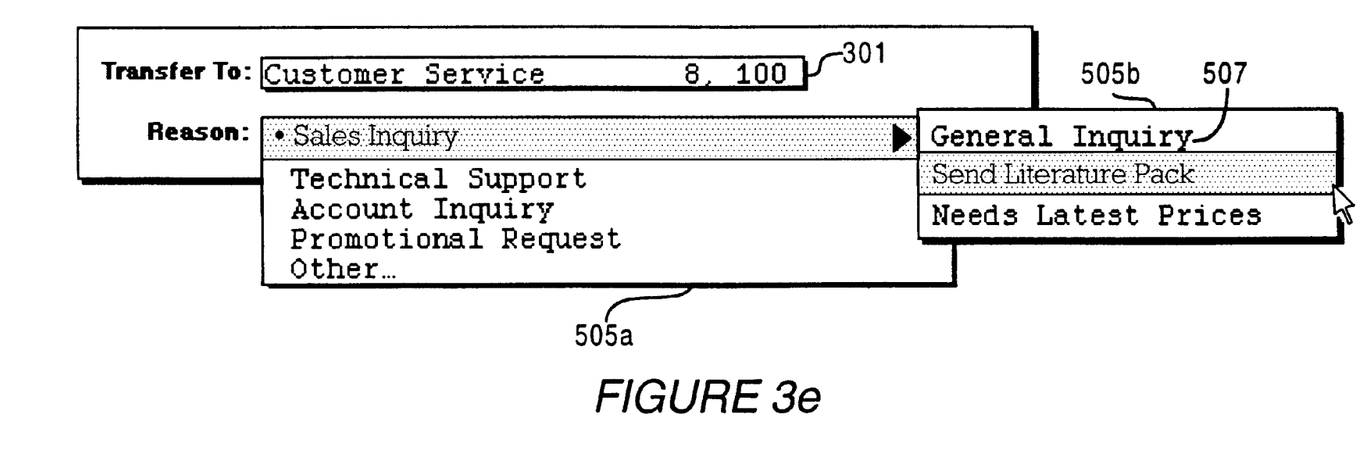
Figure 5:
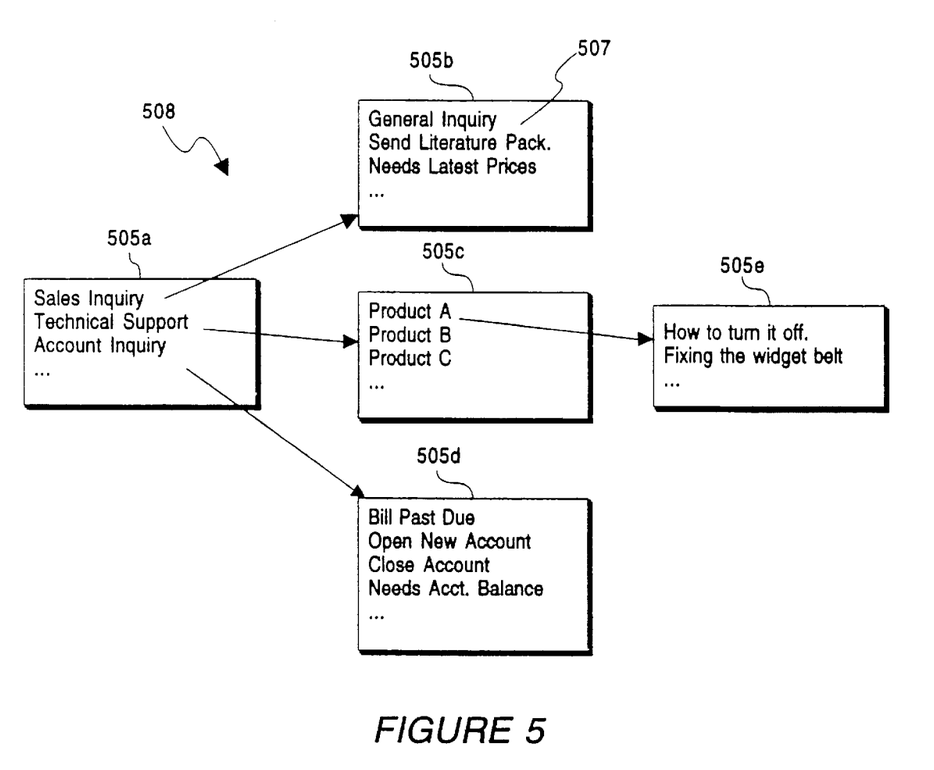
FIG. 5 is an illustration of hierarchical reason data sets for providing a hierarchical set of reasons.

The selection of reason data may also be hierarchically driven, such that the CSR first selects a top-level reason category from a menu, which in turn results in a second menu with more detailed reason data selection within the top-level reason category. This hierarchical structure may be repeated as desired. FIG. 5 illustrates one exemplary hierarchical listing 508 of reason data elements. The hierarchical listing 508 includes a number of levels of reason data sets 505. A root reason data set 505a provides the entry point for selecting reason data elements 507. For example, a CSR may select a reason data element 507 in the root, such as "sales inquiry." The telephony client 122 then provides access to a next reason data set 505b, with more detailed reason data elements 507 that can be selected. FIG. 3e illustrates an implementation of the hierarchical listing in a menu form. The reason data sets may be extended to further sublevels, such as reason data set 508, resulting in a combined number of reason data elements being transferred from the originating CSR to the receiving CSR.

Figure 6:
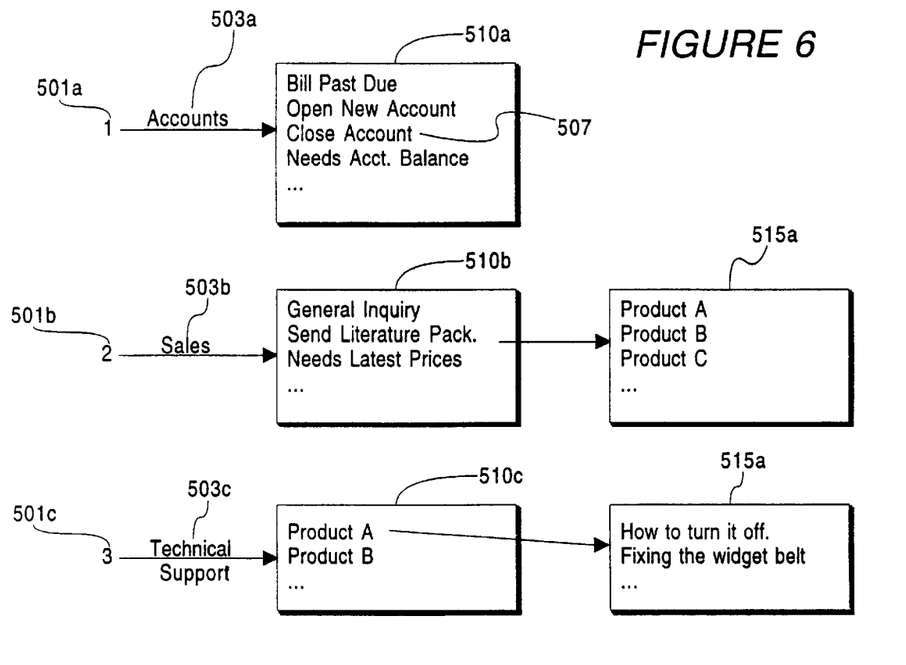
FIG. 6 is an illustration of destination driven reason data sets.

In addition, as a further refinement of the reason data element structures, for each customer service group, there may be provided a specific set of reason data elements that appears in the menu 303 when the receiving customer service group, or the receiving CSR in the group, is selected as the destination of the call transfer. FIG. 6 illustrates this type of destination driven hierarchy. In FIG. 6, there are shown three sets 510(a–c) of reason data elements 507. Each set is associated with a particular customer service group 503(a–c), which has an extension 501 assigned to its call queue by the ACD 110. Thus, the accounts customer service group 503a has extension 1, and the reason data elements 507 in the reason data set 510a associated with this group 503a include "bill past due," "open new account," and so forth. The sales customer service group 503a and the technical support group 503b also each have particular extensions 501b, 501c, and respective reason data sets 510b, 510c.

When a CSR selects the extension 501 of one customer service group, the reason data set 510 associated with the, group is displayed to the CSR for selecting a reason data element 507. For example, selecting destination extension "3" to transfer a customer call to the technical support group 503c results in the display of a reason data set 510c, from which the CSR can select the product with which the customer needs technical support. When the receiving CSR connects to the transferred customer call, he knows the reason for the transfer, and can immediately initiate further actions to assist the customer, such as retrieving technical support data from a host database 150. This destination driven data announcement provides further benefits in the efficiency and level of customer service provided by the various embodiments of the present invention. If desired, the destination driven data announcement may be combined with hierarchical listings, as further illustrated in FIG. 6, and FIG. 3e, with reason data elements 507 of each customer service group's reason data set further associated with lower level reason data sets 515(a, b). The sublevels of this hierarchy may be repeated as desired, to provide any depth and richness of customer service options needed.

The reason data elements provided by the telephony client 122 are configurable by a systems administrator, so that they may reflect the needs of the call center operations, and may be updated from time to time as needed. Thus, the reason data elements, and the configuration of the user interfaces shown in FIGS. 3a–3e, 5 and 6 are merely illustrative, and those of skill in the art will readily contemplate variations thereof in accordance with the present invention.

However determined, once the desired reason data element(s) is selected, the call transfer is completed by selecting the transfer button 306.

The reason data elements are preferably managed by the telephony server 160 and maintained in the server database 170. The reason data is then provided to each telephony client 122 when the telephony client 122 is executed on the CSR workstation 120; in this manner the reason data elements used by all the telephony clients 122 are always current. Alternatively, the reason data may be dynamically provided to a telephony client 122 in response to a request.

The reason data input by the originating CSR will be displayed to the receiving CSR to whom the customer call is transferred. In one embodiment, the reason data is displayed in the information display field 232 of the agent station 200 of the receiving CSR, as illustrated in FIG. 2. In the preferred embodiment, the agent station 200 is updated slightly before the CSR is connected to the transferred call, and the reason data is thereby displayed in the information display field 232. This allows the receiving CSR to understand the reason for the transfer before even speaking to the customer, and thus to continue efficiently handling the customer's needs, without having to obtain additional information from the customer, and without having to communicate directly with the originating CSR. As can be further understood, this method eliminates the time the originating CSR spends waiting in the ACD queue with the customer to reach the receiving CSR, and the time the receiving CSR spends obtaining information from the customer. The overall result is thereby improved customer service.

As another benefit and feature of the present invention, call center efficiency can be more accurately monitored. Because the reason for the transfer is represented as computer data, it can be discretely tracked and evaluated, to provide an analysis of CSR productivity, call center efficiency, and call center operations. For example, for each CSR, the present invention allows a system administrator to determine which reasons are used most often and least often by the CSRs for transferring a call, and to which groups the CSRs transfer customer calls and for which reasons. This information may help identify where a CSR needs further training in providing customer service. Further, it informs the underlying business operations of critical issues customers have in the underlying business products or services, and may thereby lead to improved products and services.

Likewise, with the reason data inputs, the system administrator can track individual CSR productivity as a function of reasons for call transfers. In addition, tracking the reason data for transfers allows the systems administrator to identify the critical points in customer service, enabling retraining or reorganization of the customer service groups to reduce the number of transfers and improve overall efficiency, productivity, and customer service. In addition, reason data tracking may be used to optimize the system configuration, such as the organization of the physical or logical network, the menuing, voice prompts and the like of the VRU 180, and other elements of the system that may cause customer frustration or inefficiency.

Figure 4A:
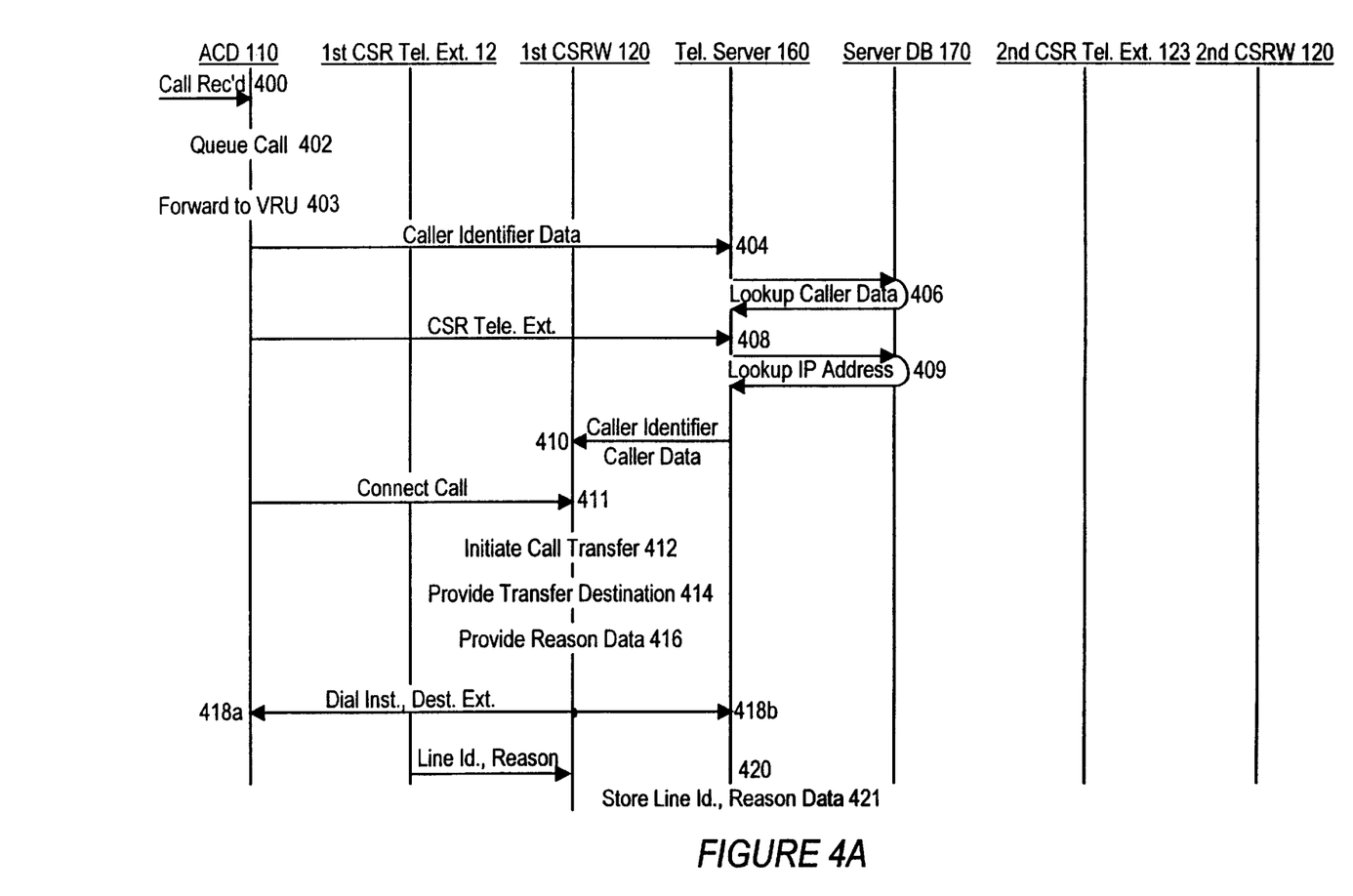
FIGS. 4A and 4B are a data and event trace of the operation of the present invention.

Referring now to FIG. 4A, a data flow and event trace diagram shows further detail of a method of transferring a customer call in accordance with one embodiment of the present invention.

A customer call is received 400 at the ACD 110. The customer call may come in on any of the available trunk lines from the public network 113, or it may come from a logically or physically connected second ACD 110. The ACD 110 queues 402 the customer call for the next available CSR telephone extension 123. The ACD 110 may also forward 403 the call to the VRU 180 to provide the caller with menu options for selecting the appropriate customer service group, obtaining caller identifier data and the like. The ACD 110 forwards 404 caller identifier data, such as the VRU data, Caller ID or ANI data, if available, to the telephony server 160. The telephony server 160 uses the caller identifier data such as the telephone number to lookup 406 additional caller identification data, such as the customer account number, from the server database 170, for example, performing lookup in table 702. This allows the telephony clients 122 to access the customer data on the host databases 150, as described above.

The ACD 110 selects an available CSR telephone extension 123 to receive the customer call according to its queuing algorithm, and forwards 408 to the telephony server 160 the selected CSR telephone extension 123. The telephony server 160 lookups 409 the network IP address of the CSR workstation 120 associated with the selected CSR telephone extension 123 in the server database 170 for example, performing the lookup in table 700. The network IP address 121 allows the telephony server 160 to properly control routing of the caller data of the customer to the selected CSR workstation 120 on the network 130. The telephony server 160 then sends 410 the caller identifier, caller data to the telephony client 122 of the selected CSR workstation 120 of the originating CSR.

In the preferred embodiment, the telephony client 122 of the selected CSR workstation 120 receives and caches or displays this data to the originating CSR in the agent station 200. The CSR may see that the customer call is waiting in the agent station 200, and connect to the customer call with the line button 226. The ACD connects 411 the customer call to the CSR workstation 122. The CSR is now able to talk to the customer and handle the call, with the agent station 200 displaying selected customer data, such as the customer's name, account number and the like. The telephony client 122 may further display the additional caller data retrieved from the host database 150. The telephony client 122 identifies the customer call as the active call on the extension 123 on which it is received.

At some point, the originating CSR decides to transfer the customer call to another CSR or customer service group to provide further assistance to the customer. The CSR initiates 412 a call transfer function of the telephony client 122, for example, using the transfer button of 220 of the agent station 200. The CSR provides 414 a CSR telephone extension 123, customer service group number as the destination for the transfer, using any of the input techniques described above. In other embodiment, the destination may be specified by the name of the CSR or customer service group, which is correlated with a destination extension or queue. The originating CSR inputs 416 a reason for the call transfer. This may be done by selecting a reason from a menu or pick list, as shown in the interfaces of FIGS. 3a–e, or other similar interface or data entry method, inputting text data, reason code, or the like.

The first CSR then completes the transfer. In a first party control embodiment, the telephony client 122 sends 418a directly to the ACD 110 a request to transfer the active call to a destination extension or destination queue. Alternatively, in the third party control embodiment, the telephony client 122 of the originating CSR workstation 120 sends 418b a request to the telephony server 160 including a dial instruction and the destination extension data to be dialed by the ACD 110. In either case, the telephony client 122 also sends 420 to the telephony server 160 the line identifier 127 of the customer call, and the reason data. The reason data may be sent as a text string. Alternatively, where the reason data is a key to a database table, the telephony client 122 will map the user's selection in the user interface to a particular key value, and transmit the key to the telephony server 160. The telephony server 160 stores 421 the line identifier 127 of the customer call, and the reason data.

Figure 4B:
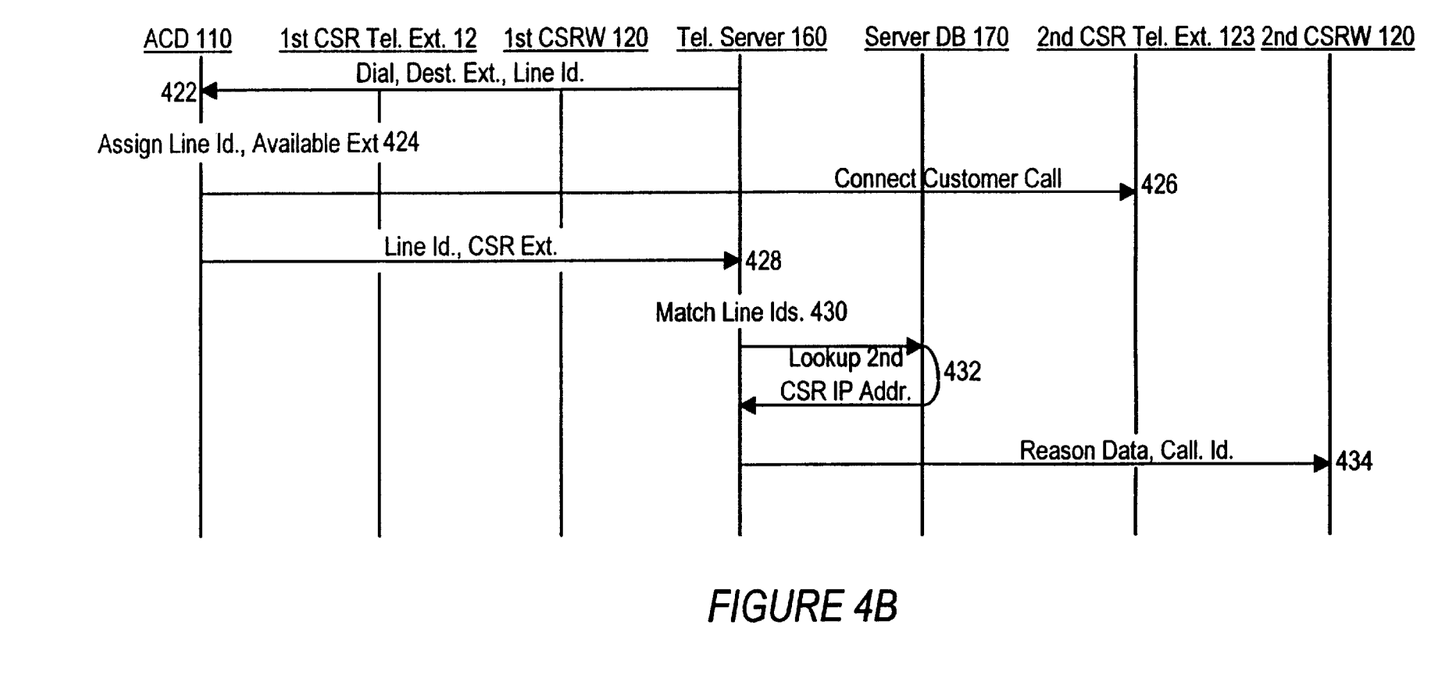

Referring now to FIG. 4B, in a third party control embodiment, the telephony server 160 instructs 422 the ACD 110 to dial the specified destination extension and transfer the active call on the originating CSR telephone extension 123. The ACD 110 takes the active call on the specified extension, and queues it for the specified destination extension, whether a particular CSR or customer service group. Since the destination may be a queue for an entire group, the telephony server 160 may not at this time have the particular telephone extension 123 of the receiving CSR to which to transfer the reason data and other caller data.

When a receiving CSR telephone extension 123 is available in a customer service group, the ACD 110 assigns 424 the extension 123 of the available CSR to the customer call, specifically linking the extension 123 of the receiving CSR with the line identifier 127. The ACD 110 then transfers 426 the customer call to the receiving CSR telephone extension 123 of the receiving CSR. The ACD 110 also sends 428 the telephony server 160 this extension 123, along with the line identifier 127.

The telephony server 160 is now able to couple the reason data from the originating CSR to the receiving CSR. The telephony server 160 matches 430 the line identifier 127 received from the ACD 110 with the stored line identifier 127 received from the originating CSR. The telephony server 160 further determines 432 the network IP address 121 of the receiving CSR workstation 120 from the extension 123 of the receiving CSR, looking up this data in the server database 170. These lookups allow the telephony server 160 to forward the reason data and other caller data from the originating CSR workstation 120 to the receiving CSR workstation 120 since the line identifier 127 of the customer call is the single constant value that both of these CSR's share with respect to the customer call. In addition, the telephony server 160 may obtain any other data available for the caller from the server database 170. If there is no customer data for the caller, the receiving CSR is still linked to the reason data via the line identifier 127. In this manner, the receiving CSR will know the reason for the transfer even if there is no existing customer data in the host databases 150. Thus, unlike some conventional system, no existing data need be present in the host databases 150 in order to provide the reason data to the receiving CSR.

The telephony server then sends 434 the reason data and the caller identifier data to the receiving CSR workstation 120 as specified by the network IP address 121 just retrieved. The reason data and caller identifier data appear in the user interface of the telephony client 122 of the receiving CSR, for example, in a user interface like the agent station 200. The receiving CSR can review the reason for the transfer, and handle the customer call in light thereof. If there is additional customer data associated with the caller, the receiving CSR can retrieve the additional data either from the telephony server 160 or the host databases 150.

In summary, in its various embodiments, the present invention provides useful systems, methods, and user interfaces for transferring customer calls in a call center. The originating CSR who handles the call and initiates the transfer and announces to a receiving CSR the reason for the transfer with selected reason data, eliminating the need for waiting on hold to vocally communicate with the receiving CSR, and without performing a blind transfer. Various embodiments of the present invention may be used in call centers without the need for significant investments in ISDN equipment and software, and without the need to have any prior data for the customer available in the system. The present invention allows for tracking CSR performance and productivity, improving call center design, and increased overall levels of customer service.

I claim:

1. A user interface arrangement of a computer system for transferring a customer call, comprising:
   a first data input field adapted to receive at least one destination for receiving the customer call;
   a second data input field adapted to receive at least one reason for transferring the customer call; and
   a transfer button that, when activated, initiates the transfer of the customer call.

2. The user interface arrangement of claim 1, wherein the second data input field includes at least one predefined reason from which at least one reason for transferring the customer call is selected.

3. The user interface arrangement of claim 1, wherein the first data input field includes at least one predefined destination from which a destination for receiving the customer call is selected.

4. The user interface arrangement of claim 2, wherein:
   each predefined reason is a first predefined reason and is associated with at least one second predefined reason; and
   selection of a first predefined reason in the second input field causes the second input field to display at least one second predefined reason associated with the selected first predefined reason.

5. The user interface arrangement of claim 1, wherein:
   the first data input field includes at least one predefined destination, each predefined destination associated with at least one predefined reason, and the first data input field is adapted to receive a selection of a predefined destination; and selection of a predefined destination in the first data input field causes the second data input field to display at least one predefined reason associated with the selected predefined destination.

6. The user interface arrangement of claim 5, wherein:

each predefined reason is a first predefined reason and is associated with at least one second predefined reason; and selection of a first predefined reason in the second input field causes the second input field to display at least one second predefined reason associated with the selected first predefined reason.

7. The user interface arrangement of claim 1, wherein the at least one destination is one of a group comprising:

a telephone extension;

an identifier of a customer service representative; and an identifier of a customer service group.

8. The user interface arrangement of claim 1, wherein the second data input is adapted to receive a voice recording of the at least one reason.

9. The user interface arrangement of claim 1, wherein the transfer button is activated by a mouse click.

10. The computer readable memory storing a computer program for controlling the operation of a computer processor in a computer system to provide a user interface arrangement for transferring a customer call, the computer program adapted to cause the processor to display:

a first data input field adapted to receive at least one destination for receiving the customer call;

a second data input field adapted to receive at least one reason for transferring the customer call; and a transfer button that, when activated, initiates the transfer of the customer call.

11. The computer readable memory of claim 10, wherein the computer program stored thereon further causes the second data input field to include at least one predefined reason from which at least one reason for transferring the customer call is selected.

12. The computer readable memory of claim 10, wherein the computer program stored thereon further causes the first data input field to include at least one predefined destination from which a destination for receiving the customer call is selected.

13. The computer readable memory of claim 11, wherein:

each predefined reason is a first predefined reason and is associated with at least one second predefined reason; and selection of a first predefined reason in the second input field causes the second input field to display at least one second predefined reason associated with the selected first predefined reason.

14. The computer readable memory of claim 10, wherein:

the first data input field includes at least one predefined destination, each predefined destination associated with at least one predefined reason, and the first data input field is adapted to receive a selection of a predefined destination; and selection of a predefined destination in the first data input field causes the second data input field to display at least one predefined reason associated with the selected predefined destination.

15. The computer readable memory of claim 14, wherein:

each predefined reason is a first predefined reason and is associated with at least one second predefined reason; and selection of a first predefined reason in the second input field causes the second input field to display at least one second predefined reason associated with the selected first predefined reason.

16. The computer readable memory of claim 10, wherein the destination is one of a group comprising:

a telephone extension;

an identifier of a customer service representative; and an identifier of a customer service group.

17. The computer readable memory of claim 16, wherein the computer program stored thereon is further adapted to receive a voice recording of the at least one reason.

18. The computer readable memory of claim 10, wherein the transfer button is activated by a mouse click.

\* \* \* \* \*